United States Patent
Wu et al.

(10) Patent No.: US 8,764,126 B2
(45) Date of Patent: Jul. 1, 2014

(54) FUZZY LOGIC BASED BRAKE CONTROL

(75) Inventors: Hsien-Cheng Kevin Wu, Novi, MI (US); Edward Heil, Brighton, MI (US)

(73) Assignee: Robert Bosch GmbH, Stuttgart (DE)

(*) Notice: Subject to any disclaimer, the term of this patent is extended or adjusted under 35 U.S.C. 154(b) by 389 days.

(21) Appl. No.: 13/099,798

(22) Filed: May 3, 2011

(65) Prior Publication Data
US 2012/0280562 A1    Nov. 8, 2012

(51) Int. Cl.
    *B60T 8/174* (2006.01)
(52) U.S. Cl.
    USPC .............. 303/151; 303/146; 303/177; 701/77
(58) Field of Classification Search
    USPC .................. 303/151, 152, 155, 140, 146, 177; 701/71, 72, 77, 82, 83
    See application file for complete search history.

(56) References Cited

U.S. PATENT DOCUMENTS

| | | | |
|---|---|---|---|
| 4,962,969 A | 10/1990 | Davis | |
| 5,358,317 A | 10/1994 | Cikanek | |
| 5,652,485 A | 7/1997 | Spiegel et al. | |
| 5,879,062 A | 3/1999 | Koga et al. | |
| 5,893,895 A | 4/1999 | Ibaraki | |
| 5,929,608 A | 7/1999 | Ibaraki et al. | |
| 5,997,107 A | 12/1999 | Koga et al. | |
| 6,283,560 B2 * | 9/2001 | Matsuno | 303/146 |
| 6,853,893 B2 | 2/2005 | Corcione et al. | |
| 7,239,945 B2 * | 7/2007 | Hiemer et al. | 701/32.2 |
| 7,597,164 B2 | 10/2009 | Severinsky et al. | |
| 2004/0034460 A1 * | 2/2004 | Folkerts et al. | 701/54 |
| 2004/0117078 A1 | 6/2004 | Corcione et al. | |
| 2008/0097684 A1 | 4/2008 | Syed et al. | |
| 2009/0043467 A1 | 2/2009 | Filev et al. | |

FOREIGN PATENT DOCUMENTS

| | | |
|---|---|---|
| DE | 10062222 | 6/2002 |
| JP | 5153701 | 6/1993 |
| JP | 2005059627 | 3/2005 |

OTHER PUBLICATIONS

International Search Report and Written Opinion for Application No. PCT/US2012/036223 dated Aug. 2, 2012 (8 pages).
Takahaski, Yoshiaki et al., "Fuzzy Logic Based Regenerative Braking Control System of Electric Wheelchair for Senior Citizen," study paper, Jun. 23, 2009, pp. 725-730, IEEE 11th International Conference on Rehabilitation Robotics, Kyoto International Conference Center, Japan.

(Continued)

*Primary Examiner* — Bradley King
(74) *Attorney, Agent, or Firm* — Michael Best & Friedrich LLP

(57) ABSTRACT

A controller for controlling braking of a wheel of a vehicle. The controller includes a first connection to a friction brake, a second connection to a motor/generator, a third connection to a plurality of sensors, and a fuzzy logic module. The motor/generator is configured to drive the wheel in a driving mode and to brake the wheel in a regenerative braking mode. Operating parameters of the vehicle are sensed by the plurality of sensors. The fuzzy logic module is configured to determine a stability of the vehicle and the wheel based on data from the plurality of sensors. The fuzzy logic module allocates braking force between the friction brake and the motor/generator operating in the regenerative braking mode based on the stability of the vehicle and the wheel.

18 Claims, 3 Drawing Sheets

(56) References Cited

OTHER PUBLICATIONS

Li, Xiangjun, et al., "Regenerative Braking Control Strategy for Fuel Cell Hybrid Vehicles using Fuzzy Logic," study results paper, Proceedings of the 11th International Conference on Electrical Machines and Systems, Oct. 17, 2008-Oct. 20, 2008, Inst. of Elec. and Elec. Eng. Computer Society.

Zhang, Jing-ming, et al.,"Fuzzy Logic Approach to Regenerative Braking System," study paper, 2009 International Conference on Intelligent Human-Machine Systems and Cybernetics, Aug. 26-27, 2009, pp. 451-454, IEEE, Piscataway, NJ, USA.

Schouten, Niels J., et al., "Fuzzy Logic Control for Parallel Hybrid Vehicles," study paper, May 2002, pp. 460-468, vol. 10, No. 3, IEEE Transactions on Control Systems Technology.

Peng, D., et al., "Combined Control of a Regenerative Braking and Anti-lock Braking System for Hybrid Electric Vehicles," study paper, Dec. 2008, pp. 749-757, vol. 9, No. 6, International Journal of Automotive Technology, The Korean Society of Automotive Engineers.

Kim, Donghyun, et al., "Vehicle Stability Control With Regenerative Braking and Electronic Brake Force Distribution for a Four-Wheel Drive Hybrid Electric Vehicle," Feb. 22, 2006, pp. 683-693, vol. 220, No. 6, Proceedings of the Institution of Mechanical Engineers, Part D: Journal of Automobile Engineering.

Kim, D-H, et al., "Optimal Brake Torque Distribution for a Four-Wheel-Drive Hybrid Electric Vehicle Stability Enhancement," Nov. 2007, pp. 1357-1366, vol. 221, No. D11, Journal of the Automobile Engineering.

* cited by examiner

FUZZY LOGIC BASED BRAKE CONTROL

BACKGROUND

The invention relates to controlling the ratio of regenerative braking to friction braking in hybrid vehicles. Specifically, fuzzy logic is used to determine the amount of regenerative and friction braking to use based on a variety of sensed parameters.

Hybrid vehicles generally use regenerative braking to decelerate the vehicle and recharge the batteries. However, in certain circumstances (e.g., during a dynamic maneuver such as skid correction) the vehicle uses friction braking because of the greater braking control provided by friction breaking.

SUMMARY

The invention uses fuzzy logic to determine a ratio of regenerative braking to friction breaking for each wheel of a vehicle, enabling greater use of regenerative braking, and, thus, greater recapture of energy from the vehicle.

In one embodiment, the invention provides a controller for controlling braking of a wheel of a vehicle. The controller includes a first connection to a friction brake, a second connection to a motor/generator, a third connection to a plurality of sensors, and a fuzzy logic module. The motor/generator is configured to drive the wheel in a driving mode and to brake the wheel in a regenerative braking mode. Operating parameters of the vehicle are sensed by the plurality of sensors. The fuzzy logic module is configured to determine a stability of the vehicle and the wheel based on data from the plurality of sensors. The fuzzy logic module allocates braking force between the friction brake and the motor/generator operating in the regenerative braking mode based on the stability of the vehicle and the wheel.

In another embodiment the invention provides a method of allocating braking force in a vehicle between a regenerative brake and a friction brake. The method includes receiving a sensed speed of a wheel, a yaw rate of the vehicle, and lateral acceleration of the vehicle, determining an acceleration/deceleration of the wheel, a slip of the wheel, and a jerk of the wheel, performing a first fuzzy operation on the jerk, the slip, the yaw rate, the lateral acceleration, and the acceleration/deceleration of the wheel, the first fuzzy operation returning a value indicative of a stability of the respective wheel parameter, performing a second fuzzy operation on a vehicle speed, the second fuzzy operation returning a value indicative of an impact the vehicle speed has on the stability of the vehicle, determining via a third fuzzy operation an amount of braking power to be applied via regenerative braking versus friction braking, and providing an indication of the amount of braking power to be applied via regenerative braking to a regenerative brake.

In another embodiment the invention provides a vehicle, including a wheel, a wheel speed sensor, a friction brake configured to brake the wheel, a motor/generator configured to drive the wheel in a driving mode and to brake the wheel in a regenerative braking mode, a throttle sensor configured to sense a position of a throttle of the vehicle, a brake pedal sensor configured to sense a position of a brake pedal of the vehicle, a plurality of sensors sensing operating parameters of the vehicle, and a controller coupled to the wheel speed sensor, the friction brake, the motor/generator, the throttle sensor, the brake pedal sensor, and the plurality of sensors. The controller includes a fuzzy logic module configured to determine a stability of the vehicle based on data from the plurality of sensors and to allocate braking force between the friction brake and the motor/generator operating in the regenerative braking mode based on the stability of the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
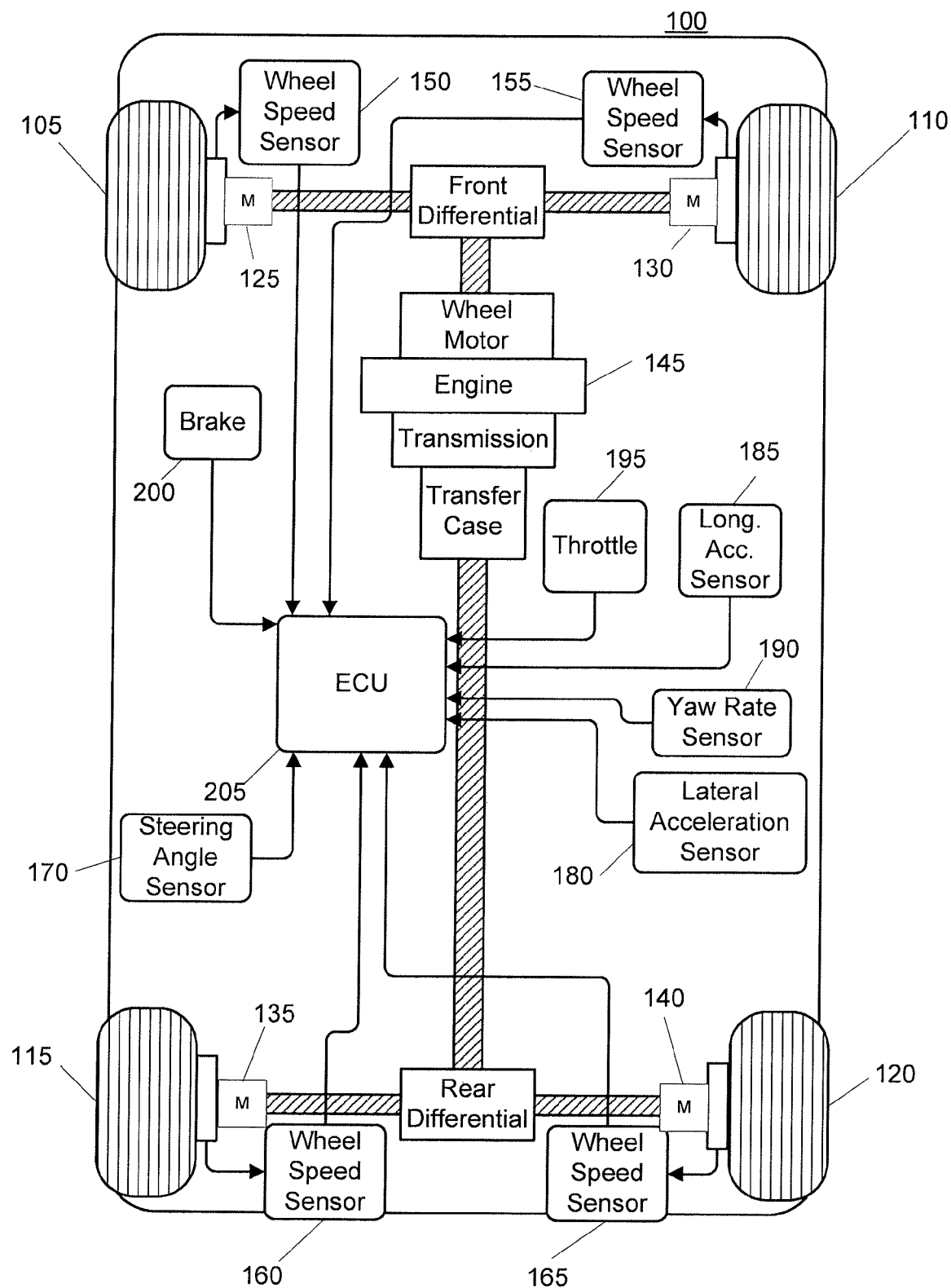
FIG. 1 is a block diagram of a vehicle.

FIG. 1 shows a hybrid vehicle 100. The vehicle 100 includes a left front wheel 105, a right front wheel 110, a left rear wheel 115, and a right rear wheel 120. Each of the wheels 105-120 has an associated motor/generator 125-140. The wheels are capable of being driven by a combustion engine 145 and/or their electric motors 125-140 (which in the embodiment shown are position directly adjacent each wheel). The vehicle 100 also includes a plurality of sensors including wheel speed sensors 150-165 (each associated with one of the wheels 105-120), a steering angle sensor 170, a lateral acceleration sensor 180, a longitudinal acceleration sensor 185, a yaw rate sensor 190, a throttle position sensor 195, and a brake pedal position sensor 200. The sensors 170-200 provide indications of the various parameters they sense to an engine control unit (ECU) 205 which includes electronic stability control functionality. In some embodiments, one or more of the sensors are not used. Instead the information that would be provided by the sensor is developed using data from one or more other sensors.

Figure 2:
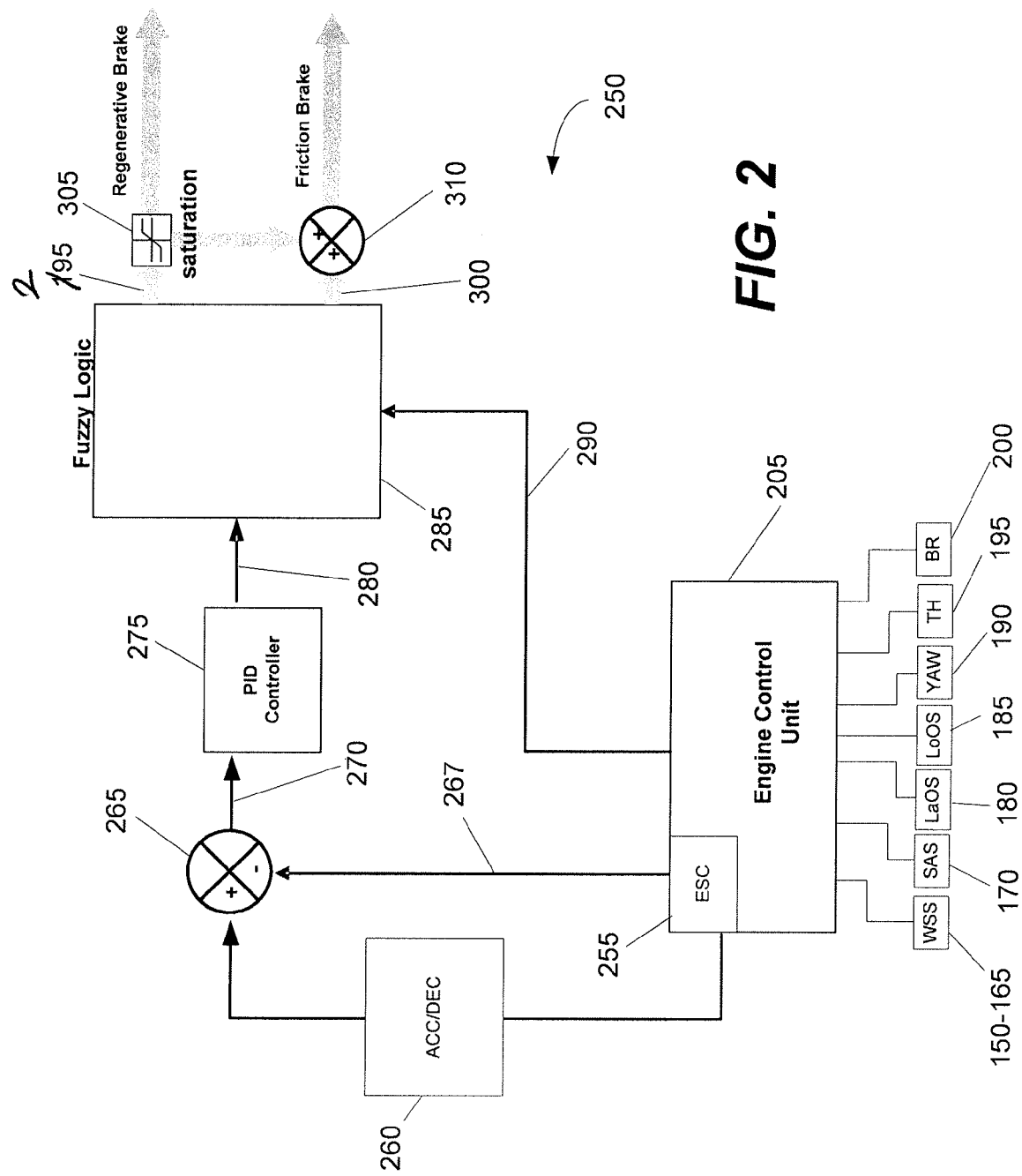
FIG. 2 is a model of a fuzzy logic based system for allocating braking force between regenerative and friction brakes.

FIG. 2 shows a block diagram of a model 250 of the operation of a system using fuzzy logic to allocate braking control between regenerative braking and friction braking for a wheel of the vehicle 100. The model 250 can be implemented in hardware, software, or a combination of hardware and software. In addition, modules described below can be implemented in hardware, software, or a combination of hardware and software, and can be integrated or distributed. The wheel speed sensors 150-165, the steering angle sensor 170, the lateral acceleration sensor 180, the longitudinal acceleration sensor 185, the yaw rate sensor 190, the throttle position sensor 195, and the brake pedal position sensor 200 provide signals indicative of their respective sensed parameters to the ECU 205. An electronic stability control (ESC) module 255 of the ECU 205 provides information on the brake pedal and throttle positions to an acceleration/deceleration module 260. The module 260 determines a desired acceleration/deceleration (e.g., in meters per second squared—m/s2). The module provides the desired acceleration/deceleration to a subtractor 265. The ESC module 255 also provides an indication of actual acceleration/deceleration 267 (in m/s2) to the subtractor 265. The actual acceleration/deceleration is obtained from the longitudinal acceleration sensor 185. In some embodiments, the acceleration/deceleration is determined using data from sensors other than the longitudinal acceleration sensor 185 (e.g., using wheel speed sensors). The subtractor 265 generates an error signal 270 indicative of the difference between the desired acceleration/deceleration and the actual acceleration/deceleration. The error signal 270 is provided to a proportional-integral-derivative (PID) controller 275. The PID controller 275 is a closed-loop controller which generates a braking signal 280 indicative of an amount of braking force that should be applied based on present and past desired and actual vehicle acceleration/deceleration. The braking signal 280 is indicative of an amount of braking force that should be applied to an individual wheel.

The braking signal 280 is fed to a fuzzy logic controller 285. The fuzzy logic controller 285 also receives a plurality of signals 290 from the ESC module 255. The plurality of signals 290 include data on the wheel speed, wheel acceleration/deceleration, wheel jerk, wheel slip, vehicle lateral acceleration, and vehicle yaw rate. Using the plurality of signals 290, the fuzzy logic controller 285 allocates braking force between regenerative and friction braking. The fuzzy logic controller 285 determines a stability of the vehicle 100 and of the individual wheel, assigning values between zero (i.e., very unstable) and one (very stable). The greater the stability, the more of the braking force that is allocated to regenerative braking. The fuzzy logic controller 285 produces a signal 295 indicative of the force to be applied by regenerative braking, and a signal 300 indicative of the force to be applied by friction braking.

There is a limit to the amount of braking force regenerative braking can provide. This is referred to as the regenerative braking saturation point. The fuzzy logic controller 285 provides the signal 295 to a saturation module 305. If the braking force to be applied by regenerative braking exceeds a saturation point, the saturation module 305 provides a signal to the regenerative brake to apply its maximum braking force, and also provides a signal to an adder 310 indicative of the amount of braking force that exceeds the saturation point. The adder 310 combines the amount of force that exceeds the saturation point with the amount of friction braking force received from the fuzzy logic controller 285 (signal 300), and provides a signal to the friction braking system indicating the combined braking force the friction braking system should provide.

In some embodiments, the ECU 205 and/or other modules include a processor (e.g., a microprocessor, microcontroller, ASIC, DSP, etc.) and memory (e.g., flash, ROM, RAM, EEPROM, etc.; i.e., a non-transitory computer readable medium), which can be internal to the processor, external to the processor, or both.

Operation of the Fuzzy Logic Controller 285

The fuzzy logic controller 285 uses a plurality of process variables and sensed parameters. The list below shows the variables and parameters used by the fuzzy logic controller:

V=vehicle speed (m/s).
$\psi$=yaw input from the yaw rate sensor 190 in radians per second (rad/s).
$\gamma$=fuzzy based weighting factor based on vehicle speed.
$\lambda$=wheel slip (%).
V'''=wheel jerk (m/s$^3$).
V'=wheel acceleration/deceleration (m/s$^2$).
Ay=lateral acceleration (m/s$^2$) (from the lateral acceleration sensor 180).
axF=longitudinal acceleration (m/s$^2$) (from the longitudinal acceleration sensor 185).

$X_1$ is an output of a first fuzzy logic operation based on V'.
$X_2$ is an output of a second fuzzy logic operation based on V'''.
$X_3$ is an output of a third fuzzy logic operation based on $\lambda$.
$X_4$ is an output of a fourth fuzzy logic operation based on Ay.
$X_5$ is an output of a fifth fuzzy logic operation based on $\psi$.
$Y_1, Y_2, Y_3$ are temporary variables.
$C_1$ and $C_2$ are parameters that are preset based on the fuzzy logic operation.
RB is the regenerative braking portion of the total braking force.
FB is the friction braking portion of the total braking force.

Figure 3:
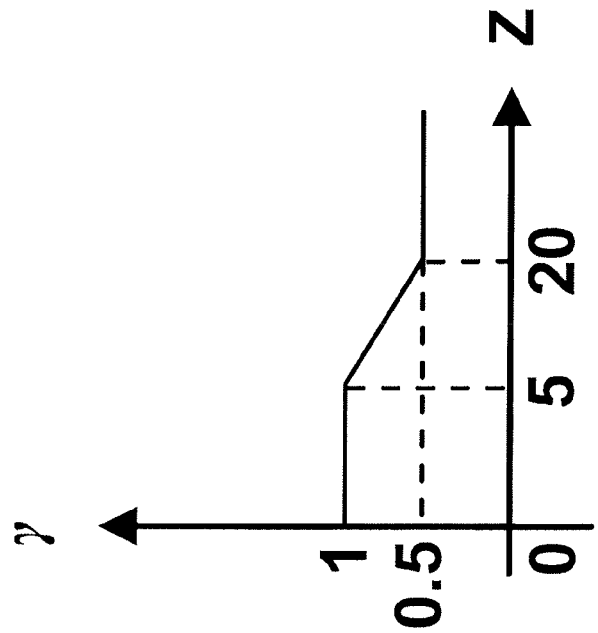
FIG. 3 is a fuzzy logic graph for determining a weighting factor based on vehicle speed.

Each of the fuzzy logic operations returns a value between zero and one inclusive. In some embodiments, $\gamma$ is determined based on the speed of the vehicle 100 using the chart shown in FIG. 3. When the vehicle 100 is traveling at less than 5 m/s, $\gamma=1$. When the vehicle 100 is traveling at greater than 20 m/s, $\gamma=0.5$. When the vehicle 100 is traveling at a speed between 5 and 20 m/s, $\gamma$ is determined by the equation $\gamma=1-(V-5)/30$ as shown in FIG. 3.

Figure 4:
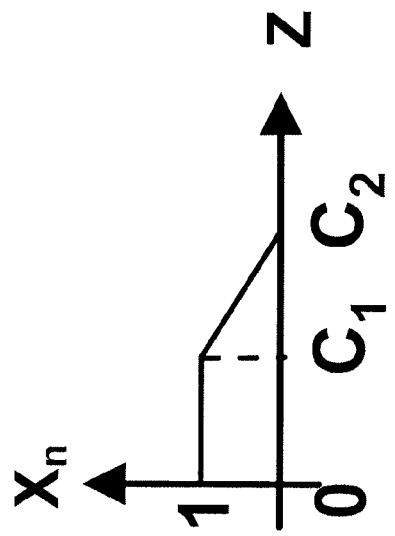
FIG. 4 is a first fuzzy logic graph for determining an output based on an input and a pair of variables.
Figure 5:
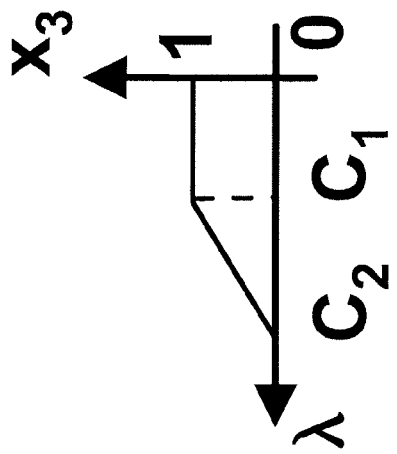
FIG. 5 is a second fuzzy logic graph for determining an output based on an input and a pair of variables.

In some embodiments, X1, X2, X4, and X5 are determined using the graph shown in FIG. 4. X3 is determined using the graph shown in FIG. 5 when the vehicle is accelerating, and using the graph in FIG. 4 when the vehicle is decelerating. In one embodiment, when the vehicle 100 is taking off (accelerating from a stop) or accelerating:

$X_1$ is determined using input |V'| and parameters $C_1=4.2$ m/s$^2$ and $C_2=6.0$ m/s$^2$.
$X_2$ is determined using input |V'''| and parameters $C_1=2$ m/s$^3$ and $C_2=20$ m/s$^3$.
$X_3$ is determined using input $\lambda$ and parameters $C_1=f(V)$ and $C_2=f(V)$.
$X_4$ is determined using input |Ay| and parameters $C_1=3.0$ m/s$^2$ and $C_2=9.0$ m/s$^2$.
$X_5$ is determined using input |$\psi$| and parameters $C_1=0.4$ rad/s and $C_2=0.7$ rad/s.

And, when the vehicle 100 is decelerating:

$X_1$ is determined using input |V'| and parameters $C_1=8.4$ m/s$^2$ and $C_2=14.0$ m/s$^2$.
$X_2$ is determined using input |V'''| and parameters $C_1=15$ m/s$^3$ and $C_2=150$ m/s$^3$.
$X_3$ is determined using input X and parameters $C_1=0.03$ and $C_2=0.07$.
$X_4$ is determined using input |ay| and parameters $C_1=2.0$ m/s$^2$ and $C_2=8.0$ m/s$^2$.
$X_5$ is determined using input |$\psi$| and parameters $C_1=0.3$ rad/s and $C_2=0.6$ rad/s.

Once X1 through X5 are determined, they are used to solve the following equations:

$$Y_1=\gamma*\mathrm{MIN}(X_1,X_2)+(1-\gamma)*(X_1+X_2)/2$$

$$Y_2=\gamma*\mathrm{MIN}(Y_1,X_3)+(1-\gamma)*(Y_1+X_3)/2$$

$$Y_3=\gamma*\mathrm{MIN}(Y_2,X_4)+(1-\gamma)*(Y_2+X_4)/2$$

Then the portion of braking force to be applied to regenerative braking PR is determined by:

$$P_R=\gamma*\mathrm{MIN}(Y_3,X_5)+(1-\gamma)*(Y_3+X_5)/2$$

Finally, the actual regenerative braking force BR is determined by multiplying the portion by the output of the PID controller 285:

$$B_R=P_R*PID\mathrm{OUT}$$

And, the actual friction braking force BF is determined by multiplying the portion to be applied to friction braking (1−PR) by the output of the PID controller 285:

$$B_F = (1-P_R) * PIDOUT$$

Again, any BR that exceeds a predetermined saturation threshold is added to BF. The process is performed for each of the four wheels.

For example, for a situation where the vehicle 100 is traveling at 10 m/s ($\gamma=0.83$) and is accelerating at a slow rate (V'<4.2 m/s2), wheel jerk is small (V"<2 m/s3), wheel slip is small, vehicle yaw rate is small ($\psi<0.4$ rad/s), and vehicle lateral acceleration is small (Ay<3.0 m/s2). In addition, X1 through X5 are all 1.0 (very stable). Solving the equations above results in RB being one. This means that all braking force (up to saturation) is applied via regenerative braking.

As a second example, consider a situation where the vehicle 100 is braking in a turn, and the vehicle 100 is decelerating from 20 m/s ($\gamma=0.5$) at a relatively rapid wheel deceleration (V'·12 m/s$^2$), wheel jerk is moderate (V"~82 m/s3), wheel slip is moderate, vehicle yaw rate is relatively large ($\Phi$~5.4 rad/s), and vehicle lateral acceleration is large (Ay~7.7 m/s2), using the fuzzy operations, X1=0.3, X2=0.5, X3=0.6, X4=0.1, X5=0.2, and solving the equations above, yields Y1=0.35, Y2=0.4125, Y3=0.1781, and RB=0.1836. Therefore, FB=0.8164. Because the sensed parameters indicate that the vehicle 100 and the wheel are relatively unstable, 82% of the braking force is applied using friction braking and 18% is applied via regenerative braking. However, this 18% of regenerative braking is greater than prior-art systems, which go to 100% friction braking, and 0% regenerative braking, whenever an unstable condition is encountered.

The variables used above are for example only, and are not intended to be limiting. Variables can be chosen based on actual vehicle testing, and can vary between different vehicles.

Thus, the invention provides, among other things, a fuzzy logic based brake control system. Various features and advantages of the invention are set forth in the following claims.

What is claimed is:

1. A controller for controlling braking of a wheel of a vehicle, the controller comprising:
    a first connection to a friction brake;
    a second connection to a motor/generator configured to drive the wheel in a driving mode and to brake the wheel in a regenerative braking mode;
    a third connection to a plurality of sensors sensing operating parameters of the vehicle; and
    a fuzzy logic module configured to
        determine a fuzzy based weighting factor based on a speed of the vehicle,
        determine a stability of the vehicle and the wheel based on data from the plurality of sensors and the fuzzy based weighting factor, and
        allocate braking force between the friction brake and the motor/generator operating in the regenerative braking mode based on the stability of the vehicle and the wheel;
    wherein the controller determines a ratio of regenerative braking to the friction braking based on $$Y_1 = \gamma * MIN(X_1, X_2) + (1-\gamma) * (X_1+X_2)/2$$

$$Y_2 = \gamma * MIN(Y_1, X_3) + (1-\gamma) * (Y_1+X_3)/2$$

$$Y_3 = \gamma * MIN(Y_2, X_4) + (1-\gamma) * (Y_2+X_4)/2$$

where $\gamma$=fuzzy based weighting factor based on a speed of the vehicle, $X_1$ is an output of a first fuzzy logic operation based on an acceleration/deceleration of the wheel, $X_2$ is an output of a second fuzz logic operation based on a jerk of the wheel, $X_3$ is an output of a third fuzz logic operation based on a slip of the wheel, $X_4$ is an output of a fourth fuzzy logic operation based on a lateral acceleration of the vehicle, $X_5$ is an output of a fifth fuzz logic operation based on a yaw rate of the vehicle, and the Ratio of regenerative braking=$\gamma * MIN(Y_3, X_5) + (1-\gamma) * (Y_3+X_5)/2$.

2. The controller of claim 1, wherein the plurality of sensors includes a throttle position sensor, a brake pedal position sensor, a yaw rate sensor, a wheel speed sensor, and a lateral acceleration sensor.

3. The controller of claim 1, wherein the fuzzy logic module determines the stability of the vehicle based at least in part on a slip of the wheel.

4. The controller of claim 1, wherein the fuzzy logic module determines the stability of the vehicle based at least in part on an acceleration/deceleration of the wheel.

5. The controller of claim 1, wherein the fuzzy logic module determines the stability of the vehicle based at least in part on a jerk of the wheel.

6. The controller of claim 1, wherein the fuzzy logic module determines the stability of the vehicle based at least in part on a lateral acceleration of the vehicle.

7. The controller of claim 1, wherein the fuzzy logic module determines the stability of the vehicle based at least in part on a yaw rate of the vehicle.

8. The controller of claim 1, wherein the fuzzy logic module returns a value between zero and one inclusive.

9. The controller of claim 1, further comprising a PID function to determine a total amount of braking force to be applied.

10. The controller of claim 9, wherein the total amount of braking force is allocated between the regenerative braking and the friction braking based on a calculated ratio.

11. The controller of claim 1, further comprising a saturation module, the saturation module comparing an amount of braking force to be applied to regenerative braking to a threshold and allocating the amount of braking force to be applied to regenerative braking that exceeds the threshold to the friction braking.

12. A method of allocating braking force in a vehicle between a regenerative brake and a friction brake, the method comprising:
    receiving a sensed speed of a wheel, a yaw rate of the vehicle, and lateral acceleration of the vehicle;
    determining an acceleration/deceleration of the wheel, a slip of the wheel, and a jerk of the wheel;
    performing a first fuzzy operation on the jerk, the slip, the yaw rate, the lateral acceleration, and the acceleration/deceleration of the wheel, the first fuzzy operation returning a value indicative of a stability of the respective wheel parameter;
    performing a second fuzzy operation on a vehicle speed, the second fuzzy operation returning a value indicative of an impact the vehicle speed has on the stability of the vehicle;
    determining via a third fuzzy operation an amount of braking power to be applied via regenerative braking versus friction braking; and providing an indication of the amount of braking power to be applied via regenerative braking to a regenerative brake.

13. The method of claim 12, wherein the amount of braking power to be applied via the regenerative braking to the friction braking is determined using:

$$Y_1 = \gamma * MIN(X_1, X_2) + (1-\gamma) * (X_1 + X_2)/2$$

$$Y_2 = \gamma * MIN(Y_1, X_3) + (1-\gamma) * (Y_1 + X_3)/2$$

$$Y_3 = \gamma * MIN(Y_2, X_4) + (1-\gamma) * (Y_2 + X_4)/2$$

where
$\gamma$=fuzzy based weighting factor based on the vehicle speed,
$X_1$ is an output of a first fuzzy logic operation based on the acceleration/deceleration of the wheel,
$X_2$ is an output of a second fuzzy logic operation based on the jerk,
$X_3$ is an output of a third fuzzy logic operation based on the slip of the wheel,
$X_4$ is an output of a fourth fuzzy logic operation based on the lateral acceleration of the vehicle,
$X_5$ is an output of a fifth fuzzy logic operation based on the yaw rate of the vehicle, and
a ratio of regenerative braking=$\gamma * MIN(Y_3, X_5) + (1-\gamma) * (Y_3 + X_5)/2$.

14. The method of claim 12, wherein the values indicative of stability are between zero and one inclusive.

15. The method of claim 12, further comprising determining by a PID function a total amount of braking force to be applied.

16. The method of claim 12, further comprising allocating a total amount of braking force is between the regenerative braking and the friction braking based on a calculated ratio.

17. The method of claim 12, further comprising determining an amount of regenerative braking force that exceeds a saturation threshold and allocating the amount of regenerative braking force that exceeds a threshold to the friction braking.

18. A vehicle, comprising:
a wheel;
a wheel speed sensor;
a friction brake configured to brake the wheel;
a motor/generator configured to drive the wheel in a driving mode and to brake the wheel in a regenerative braking mode;
a throttle sensor configured to sense a position of a throttle of the vehicle;
a brake pedal sensor configured to sense a position of a brake pedal of the vehicle;
a plurality of sensors sensing operating parameters of the vehicle;
a controller coupled to the wheel speed sensor, the friction brake, the motor/generator, the throttle sensor, the brake pedal sensor, and the plurality of sensors, the controller configured to
receive a sensed speed of a wheel, a yaw rate of the vehicle, and lateral acceleration of the vehicle;
determine an acceleration/deceleration of the wheel, a slip of the wheel, and a jerk of the wheel;
perform a first fuzzy operation on the jerk, the slip, the yaw rate, the lateral acceleration, and the acceleration/deceleration of the wheel, the first fuzzy operation returning a value indicative of a stability of the respective wheel parameter;
perform a second fuzzy operation on a vehicle speed, the second fuzzy operation returning a value indicative of an impact the vehicle speed has on the stability of the vehicle;
determine via a third fuzzy operation an amount of braking power to be applied via regenerative braking versus friction braking; and
provide an indication of the amount of braking power to be applied via regenerative braking to motor/generator.

* * * * *